United States Patent
Grun et al.

(10) Patent No.: US 8,691,044 B2
(45) Date of Patent: Apr. 8, 2014

(54) EPOXIDE-BASED FIXING MORTAR HAVING SILANE ADDITIONS

(75) Inventors: Jurgen Grun, Botzingen (DE); Martin Vogel, Glottertal (DE); Clemens Schmidt, Denzlingen (DE); Christian Schlenk, Denzlingen (DE)

(73) Assignee: fischerwerke GmbH & Co. KG, Waldachtal (DE)

( * ) Notice: Subject to any disclaimer, the term of this patent is extended or adjusted under 35 U.S.C. 154(b) by 0 days.

(21) Appl. No.: 13/634,905

(22) PCT Filed: Mar. 2, 2011

(86) PCT No.: PCT/EP2011/001016
§ 371 (c)(1),
(2), (4) Date: Sep. 14, 2012

(87) PCT Pub. No.: WO2011/113533
PCT Pub. Date: Sep. 22, 2011

(65) Prior Publication Data
US 2013/0000839 A1   Jan. 3, 2013

(30) Foreign Application Priority Data

Mar. 16, 2010   (DE) .................. 10 2010 015 981

(51) Int. Cl.
*C08G 59/14*     (2006.01)
*C08L 63/02*     (2006.01)
*C08K 5/548*     (2006.01)
*B32B 37/12*     (2006.01)
*C08K 5/544*     (2006.01)

(52) U.S. Cl.
USPC ........... 156/293; 523/455; 523/456; 523/453; 525/485; 525/523; 525/533; 220/500

(58) Field of Classification Search
None
See application file for complete search history.

(56) References Cited

U.S. PATENT DOCUMENTS

| 3,532,653 | A | * | 10/1970 | Smeal ............................ 523/450 |
| 4,673,750 | A | * | 6/1987 | Beers et al. .................... 549/215 |
| 4,689,390 | A | * | 8/1987 | Suzuki et al. ................. 528/118 |
| 5,229,438 | A | * | 7/1993 | Ishida et al. ................... 523/428 |
| 5,942,073 | A | * | 8/1999 | Mowrer et al. ............... 156/329 |
| 7,223,821 | B2 | * | 5/2007 | Okuhira et al. ............... 525/528 |
| 7,264,669 | B1 | * | 9/2007 | Tomasino et al. ........ 106/287.11 |
| 7,498,389 | B2 | | 3/2009 | Vogel et al. |
| 7,605,220 | B2 | * | 10/2009 | Wakabayashi et al. ......... 528/18 |
| 2004/0092656 | A1 | | 5/2004 | Vogel et al. |
| 2004/0092673 | A1 | | 5/2004 | Vogel et al. |
| 2006/0135656 | A1 | | 6/2006 | Briand et al. |
| 2009/0305051 | A1 | * | 12/2009 | Corsaro .................... 428/423.1 |
| 2010/0294676 | A1 | | 11/2010 | Grun et al. |
| 2011/0190420 | A1 | | 8/2011 | Nagelsdiek et al. |

FOREIGN PATENT DOCUMENTS

| DE | 10 2006 054 471 A1 | 5/2008 |
| DE | 10 2008 018 861 A1 | 12/2009 |
| EP | 0 570 611 A1 | 11/1993 |
| WO | 02/079293 A1 | 10/2002 |
| WO | 2002/079341 A1 | 10/2002 |
| WO | 2005/090433 A1 | 9/2005 |
| WO | 2010/020401 A2 | 2/2010 |

OTHER PUBLICATIONS

International Preliminary Report on Patentability for corresponding International Application No. PCT/EP2011/001016 dated Sep. 18, 2012.
International Search Report for corresponding International Application No. PCT/EP2011/001016 mailed Aug. 8, 2011 and English translation thereof.
Form PCT/ISA/237 for corresponding International Application No. PCT/EP2011/001016 mailed Aug. 8, 2011.
Roulin-Moloney et al., "Parameters Determining the Strength and Toughness of Particulate-Filled Epoxy Resins", Polymer Composites, vol. 8, No. 5, Oct. 1987, pp. 314-323.
Taraszkiewicz et al., "Fabrication of Friction Inserts for Increasing Load Capacity Especially for Friction Couplings with High-Strength Bolts", Chemical Abstracts, vol. 110, No. 2, Jan. 1989, p. 269, abstract.

* cited by examiner

*Primary Examiner* — Robert S Loewe
(74) *Attorney, Agent, or Firm* — Renner, Otto, Boisselle & Sklar, LLP

(57) ABSTRACT

The invention relates to a fixing mortar system for embedding anchoring means in mortar in holes or crevices, based on one or more hardening epoxy-based reactive resins, characterised in that it includes silanes which may or may not have reactive groups capable of participating in the polymerisation with a synthetic resin based on the hardening epoxy-based reactive synthetic resin(s) but which in any case have Si-bonded hydrolysable groups, and to related inventive subject matter such as processes, kits and uses.

13 Claims, No Drawings

EPOXIDE-BASED FIXING MORTAR HAVING SILANE ADDITIONS

The invention relates to a fixing mortar system for embedding anchoring means in mortar in holes or crevices, based on hardening epoxy-based reactive resins (hardening after starting and by reaction with a hardener), and to the use thereof for embedding anchoring means in mortar in holes or crevices.

A range of (for example injection) fixing mortar systems based on an extremely wide variety of polymer-forming components is known, sometimes in the form of single-component systems and sometimes in the form of two-component or multi-component systems, which are used for embedding anchoring means, such as bolts or the like, in mortar in holes, such as drilled holes, or crevices, in each case in solid substrates such as, for example, masonry or concrete. Further components can then be fixed to the anchoring means. The embedding of the anchoring means in mortar is based, on the one hand, on adhesive effects in the sense of a material-based connection between the synthetic mortar and an anchoring element and/or the wetted surface of the hole or crevice and, on the other hand, on an interlocking connection, such as, for example, undercuts formed by using the synthetic mortar to surround projecting or recessed portions of the anchoring element and/or of the hole or crevice.

An example of especially well suited systems are those based on epoxides, such as especially glycidyl compounds, and suitable hardeners.

FIS EM 390 S® (fischerwerke GmbH & Co. KG, Waldachtal, Germany) is a very successful example, established on the market, of a two-component injection mortar system for embedding anchoring elements in mortar, based on such an epoxy resin in component A and on amines as such a hardener in component B, and in addition further constituents in each component.

Such injection mortar systems exhibit very good properties for fixing even in moist and dirty holes, but new regulations are especially raising the requirements to include conditions of relatively high wetness and residual dirt, such as, for example, in line with conditions described in the guidelines of the European Organisation for Technical Approvals (EOTA) (2001): ETAG No. 001, November 2006 edition, Guideline for European Technical Approval of Metal Anchors for Use in Concrete, Part 5: Bonded Anchors, February 2008 edition, under 5.1.2.1 (b), where confined tests in non-cracked concrete C 20/25 are described, using inter alia electric hammer drills. The influence of the drill hole cleaning technique in a moist substrate is here (for the invention described hereinbelow) tested by way of example as follows, the concrete in the area of anchorage having to be water-saturated when the hole is drilled and cleaned and the anchoring element installed:

1. A hole with a diameter of approximately $0.5 \times d_0$ ($d_0$=drill hole diameter to be tested) is drilled in the concrete substrate to the anchorage depth to be tested.
2. The hole is filled with water and remains flooded for 8 days, until water has percolated into the concrete at a distance of 1.5 d to 2 d from the axis of the drilled hole.
3. The water is removed from the drilled hole.
4. The final hole is drilled at the diameter $d_0$ to be tested.

The hole is then cleaned with the hand pump and brush supplied by the manufacturer, the following procedure being adopted: one blowing operation with the hand blower/one brushing operation with the hand brush/one blowing operation with the hand blower. Then, the fixing mortar and an M12 anchoring element are introduced (for example using a 2-component cartridge with a static mixer in the test in the examples for the invention hereinbelow).

After the prescribed temperature-dependent minimum curing time, confined adhesion failure tests are then carried out, as set out in the Guideline for European Technical Approval of Metal Anchors for Use in Concrete, Part 5: Bonded Anchors, February 2008 edition, under 5.0 FIG. 2, in order to determine the adhesion failure strength of the embedded anchoring elements, for example as in the examples given hereinbelow or for the invention described in general terms hereinbelow.

In the tests, the known epoxy-based reaction systems already exhibit very good adhesion failure loads, but the new test systems and methods set further demands so that one problem lies in achieving even better properties, such as, in particular, even higher adhesion failure loads, also under those conditions—which are extremely unusual in real circumstances.

It has now been found, surprisingly, that the addition of certain silanes which, for example, may or may not have reactive groups capable of participating in the polymerisation with a synthetic resin based on epoxy-based reactive resins, but which in any case have Si-bonded hydrolysable groups, has an advantageous effect on such known epoxy resins, especially making it possible to achieve higher adhesion failure loads.

The invention accordingly relates, in a first embodiment, to a fixing mortar system, based on one or more hardening (used in the present disclosure to have equivalent meaning to hardenable) epoxy-based reactive resins, for embedding anchoring means in mortar in holes or crevices, which is characterised in that it includes silanes which may have reactive groups capable of participating in the polymerisation with a synthetic resin based on the hardening epoxy-based reactive synthetic resin(s) or may not (that is to say may not have such reactive groups) but which in any case have Si-bonded hydrolysable groups; especially characterised in that in one or more components (it being possible in all forms of implementation of the invention for each of these variants to be preferred on its own; for example in a component A (a possible preferred variant), a component B or components A and B, such as, for example, mentioned below)) it includes (even before the start of the hardening reaction), in addition to one or more hardenable epoxy-based reactive resins and corresponding hardeners, for example based on (poly)amines and/or (poly)thiols, one or more silanes that in each case include no or at least one amino, sec-amino, mercapto, isocyanato, alkenyl, (meth) acryloyl, anhydrido and/or (especially) epoxy group(s) and always include at least one Si-bonded hydrolysable group, and in addition further customary additives.

In a further embodiment(=form of implementation), the invention relates to the use of a fixing mortar system, wherein the fixing mortar system is based on hardening epoxy-based reactive synthetic resins and includes in one or more components (even before the start of the hardening reaction), in addition to the hardenable epoxy-based reactive resin(s) and one or more corresponding hardeners, for example based on (poly)amines and/or (poly)thiols, one or more silanes that include no or at least one amino, sec-amino, mercapto, epoxy, isocyanato, alkenyl, (meth)acryloyl, anhydrido and/or (especially) epoxy group(s) and at the same time at least one Si-bonded hydrolysable group, and in addition further customary additives, for embedding anchoring means in mortar in holes or crevices in substrates, such as masonry, concrete or the like, especially in cracked substrates, such as, in a special form of implementation of the invention, in cracked concrete.

One form of implementation of the invention relates also to corresponding processes and methods for embedding anchoring elements in mortar in holes or crevices, in which a fixing mortar system is used for embedding anchoring means in mortar, wherein the fixing mortar system is based on hardening epoxy-based reactive synthetic resins and includes in one or preferably more components (even before the start of the hardening reaction), in addition to the hardening epoxy-based reactive resin(s) and one or more corresponding hardeners, for example based on (poly)amines and/or (poly)thiols, one or more silanes that include no or at least one amino, sec-amino, mercapto, isocyanato, alkenyl, (meth)acryloyl, anhydrido and/or (especially) epoxy group(s) and at the same time at least one Si-bonded hydrolysable group, and in addition further customary additives, the fixing mortar system and an anchoring means being introduced in succession, especially first the fixing mortar system and then the anchoring means, or (at least substantially) simultaneously into a hole or crevice in a substrate (especially a cracked substrate, such as, in a special form of implementation of the invention, in cracked concrete).

Without wishing to be finally bound by this attempt at explanation, it is possible that the silane additives bring about better contact with the wetted substrate surface in the hole or crevice, whether it be an interlocking and/or a material-based connection.

It is very surprising that, in particular, even high proportions not only are well tolerated by the system but can even result in especially effective injection synthetic mortar systems. A resulting cured synthetic mortar (which, for embedding anchoring systems in mortar, is likely to be thick-layered) is apparently also provided with improved internal cohesion, which may well likewise contribute to the high adhesion failure values. This is an especially surprising aspect of the present invention.

A further positive effect may be the result of the very low viscosity of many silanes. When such silanes are used in epoxy-based injection mortar systems the content of other viscosity-reducing constituents, such as, for example, reactive diluents based on aliphatic glycidyl ethers, which generally have an adverse effect on effectiveness, can thus be considerably reduced or even avoided altogether. It is thus possible to formulate more effective systems. Table 1 lists some examples of viscosities (manufacturer's data, mostly obtained using a Brookfield viscometer) of silanes and reactive diluents.

TABLE 1

Comparison of the viscosities of silanes and glycidyl ethers

| Silane/reactive diluent | Viscosity [mPa · s] at 20° C. |
|---|---|
| Glycidyloxypropyl-trimethoxysilane | 3.7 |
| Tetraethoxysilane | 0.75 |
| Aminopropyl-triethoxysilane | 2 |
| Trimethylolpropane triglycidyl ether | 120-180 (at 25° C.) |
| Hexanediol diglycidyl ether | 14-20 (at 25° C.) |

In all forms of implementation of the invention the viscosity of the silanes is preferably 10 Pa*s or less, such as 1 Pa*s or less. Very special preference is given to silanes of extremely low viscosity and low molecular weight having viscosities of less than 100 mPa·s, especially less than 10 mPa·s.

Unless otherwise indicated, viscosities are measured in accordance with DIN EN ISO 2555 using a Brookfield DV-III+ viscometer with spindle 3 at 10 revolutions/minute (rev/min) at 23° C. and are given in Pa·s (also given below as Pa*s or Pas).

The fixing mortar systems according to the invention surprisingly also exhibit especially good properties in respect of their effectiveness in the tension zone, that is to say in cracked concrete, using normal threaded rods. Other mechanical properties can also be positively influenced, such as, for example, maximum elongation at break and Young's modulus.

The cured compositions are accordingly preferably high-strength, low-flexibility solids having a Young's modulus of >0.5 GPa, preferably >1 GPa or >2 GPa, a tensile strength of >1 MPa, preferably >5 MPa, especially >8 MPa and an elongation at break of <10%, preferably <5%, especially <2% or <1% (all three values measured according to DIN EN ISO 527) and a compressive strength of >5 MPa, preferably >10 MPa, especially >50 MPa or >80 MPa (measured according to DIN EN ISO 604) and a bending tensile strength of >5 MPa, especially >10 MPa or >15 MPa (measured according to DIN EN ISO 178).

In order to be able to achieve such high strengths and superior mechanical properties, it is preferable (especially when silanes carrying epoxy groups are used) to do substantially without or, preferably, entirely without the use of elastomeric structural units, especially on the hardener side.

The elongation at break is determined more exactly in accordance with DIN EN ISO 527-1 using shouldered bars of test specimen type 1 BA (in accordance with DIN EN ISO 527-2) after storage for 24 hours at room temperature.

Finally, increased effectiveness in cracked concrete compared with corresponding synthetic mortars without addition of silane can also be found in accordance with the methods of the guidelines of the European Organisation for Technical Approvals (EOTA) (2001): ETAG No. 001, November 2006 edition, Guideline for European Technical Approval of Metal Anchors for Use in Concrete, Part 5: Bonded Anchors, February 2008.

As already mentioned, the fixing systems in accordance with the present invention are therefore especially suitable for use in processes or methods for fixing anchoring means in cracked substrates, especially in cracked concrete, in each case constituting preferred forms of implementation of the invention.

The definitions hereinbelow serve to clarify certain terms or symbols and to describe special forms of implementation of the invention; in the forms of implementation of the invention mentioned hereinabove and hereinbelow it is possible for single, some or all terms or symbols to be replaced by more specific definitions, resulting in special forms of implementation of the invention.

Where weights are given in percent (% by weight), unless otherwise specified they relate to the total mass of the reactants and additives of the fixing mortar system (that is to say the constituents present in the composition to be cured after mixing, without packaging or other possible parts, such as static mixers or the like.)

The one or more silanes that carry no or at least one amino, sec-amino, mercapto, isocyanato, alkenyl, (meth)acryloyl, anhydrido and/or (especially) epoxy group(s), especially that include amino, thiol(=mercapto) and/or (preferably) epoxy groups, and include at least one Si-bonded hydrolysable group are, in special forms of implementation of the invention, those of formula I,

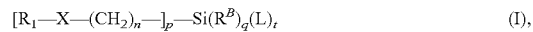

wherein

X denotes S (preferred) or $NR_1^*$ (preferred) or O or NCO or nothing; with X being nothing(=absent) when $R_1$ denotes anhydrido;

$R_1$ and $R_1^*$, all independently of one another, denote nothing, hydrogen, cycloalkyl, alkyl, aminoalkyl, (meth)acryloyl, aryl, aralkyl, acyl, heterocyclyl (especially anhydrido) or a radical of the formula $—[(CH_2)_{n*}]_{p*}—Si(R^{B*})_{3-t*}(L^*)_{t*}$ or (especially) epoxyalkyl, wherein, in each case independently of the other radical, $R^{B*}$ is as defined below for $R^B$, $L^*$ is as defined below for L and $n^*$, $p^*$ and $t^*$ are in each case as defined below; with $R_1$ being hydrogen when X denotes S; with X being O when $R_1$ is epoxyalkyl or (meth)acryloyl; with $R_1$ being nothing when X denotes NCO(=isocyanato);

$R^B$, independently of any other, denotes an alkyl, alkenyl, arylalkyl or aryl group, preferably alkyl and/or (furthermore) alkenyl, L denotes a hydrolysable radical, especially alkoxy, n and, if present, $n^*$ independently of one another denote a positive integer, especially from 1 to 10;

p denotes from 0 to 3 and, if present, $p^*$ independently denotes from 1 to 3;

q denotes from 0 to 2; and t denotes from 1 to 4 and, if present, $t^*$ independently denotes from 1 to 3, with the proviso that p+q+t=4 and, if present, $p^*+(3-t^*)+t^*=4$.

In one form of implementation of the invention it is possible to use (at least also) those silanes which exhibit the alpha effect, that is to say, for example, those wherein n and, where applicable, $n^*$ in the above formula I is 1 (n=1 and, where applicable, $n^*=1$ in formula I), for example N-cyclohexylaminomethyl-methyl-diethoxysilane, N-cyclohexylaminomethyl-trimethoxysilane, phenylaminomethyl-trimethoxysilane, phenylaminomethyl-methyldimethoxysilane, or 3-(meth)acryloyl-oxymethyltrialkoxy (such as trimethoxy) silane.

Further silanes having hydrolysable groups may be included, for example (based on the total weight of all silanes) up to 80% by weight, up to 70% by weight, up to 60% by weight, up to 50% by weight, up to 40% by weight, up to 30% by weight, up to 20% by weight or up to 10% by weight—this implies, for example, alkoxysilane compounds or silane cross-linkers, such as vinylalkoxysilanes, for example vinyltrimethoxysilane or vinyltriethoxysilane or (furthermore or especially) esters of (poly)-silicic acid (such as, for example, Dynasilan® 40 (an ethyl polysilicate) or Dynasylan® A, Evonik GmbH, Frankfurt am Main, Germany), which enable the degree of cross-linking to be controlled, or mixtures of two or more thereof.

Further special forms of implementation of the subject matter of the invention disclosed herein include silanes of formula III or the use thereof,

wherein $R^B$ denotes, independently of any other(s), an alkyl, alkenyl, arylalkyl or aryl group, preferably alkyl and/or (furthermore) alkenyl, L denotes a hydrolysable radical, especially alkoxy, and t denotes from 1 to 4. These fall under the category of silanes that do not have reactive groups capable of participating in the polymerisation with a synthetic resin based on the hardening epoxy-based reactive synthetic resin(s).

Mixtures with two or more of the silanes of formulae I, II and/or III mentioned in the preceding or following paragraphs, or the use thereof in each case, also form special variants of the forms of implementation according to the invention.

The silanes that include (i) amino groups and/or thiol groups and/or (especially) epoxyalkyl and (ii) at least one Si-bonded hydrolysable group which are to be given special mention are preferably those of formula I, as shown above, wherein p denotes 1, X denotes $NR_1^*$ or S or, especially when $R_1$ is epoxyalkyl, O;

$R_1$ and $R_1^*$, all independently of one another, denote nothing, hydrogen, cycloalkyl, alkyl, aminoalkyl, aryl, aralkyl, acyl, a radical of the formula $—[(CH_2)_n]—Si(R^{B*})_{3-t*}(L)_{t**}$ or (preferably) epoxyalkyl, wherein, in each case independently of the other radical, $R^{B*}$ is as defined below for $R^B$, $L^*$ is as defined below for L and $n^*$, $p^*$ and $t^*$ are in each case as defined below; with $R_1$ being hydrogen when X denotes S;

$R^B$, independently of any other, may denote an alkyl, alkenyl, arylalkyl or aryl group, preferably alkyl and/or (furthermore) alkenyl, L denotes a hydrolysable radical, especially alkoxy, n and, if present, $n^*$ independently of one another denote a positive integer, especially from 1 to 10;

p denotes from 0 to 4 and, if present, $p^*$ independently denotes from 1 to 3;

q denotes from 0 to 2; and t and, if present, $t^*$ independently of one another denote from 1 to 3, with the proviso that p+q+t=4 and, if present, $p^*+(3-t^*)+t=4$.

Silanes that include epoxy, amino and/or thiol groups and include at least one Si-bonded hydrolysable group are to be understood as being especially those carrying one or more groups selected from $R_1^{**}$—NH or SH and at least one Si-bonded hydrolysable group, such as, for example, corresponding preferred silanes of formula II,

wherein

Y denotes epoxyalkoxy (preferred), $R_1^{}$—NH or SH, wherein $R_1^{}$ (also where mentioned above formula II) denotes hydrogen, alkyl or aminoalkyl, $R^B$ denotes, independently of any other, an alkyl, alkenyl, arylalkyl or aryl group, preferably alkyl and/or (furthermore) alkenyl, L denotes a hydrolysable radical, especially alkoxy, a denotes a positive integer, especially from 1 to 10, more especially from 1 to 3; and t denotes from 1 to 3.

Aryl is, within this disclosure, always preferably an aromatic radical having from 6 to 18 ring carbon atoms, for example phenyl, naphthyl or toluyl, unsubstituted or mono-substituted or independently polysubstituted, for example mono- to tri-substituted (for example by alkyl, alkoxy (=alkyloxy), alkenyl, hydroxy or, furthermore, by halogen, such as fluorine, chlorine or bromine, or cyano).

Aralkyl is, within this disclosure, always aryl as defined hereinbefore which is bonded to alkyl as defined above, for example benzyl, but, in the case of lists within this disclosure, can especially be omitted.

Cycloalkyl denotes especially mono-, di- or tri-cyclic, preferably monocyclic, cycloalkyl having from 3 to 20 carbon atoms, preferably having from 3 to 10 carbon atoms, in the ring, especially cyclopentyl or cyclohexyl.

Epoxyalkyl denotes preferably alkyl as defined above which is substituted by an epoxy group, with ring formation. Epoxyalkyl is especially epoxy-$C_1$-$C_7$alkoxy, such as especially (2,3-epoxy-propan-1-yl) of formula

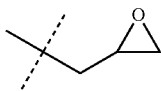

(the broken line marks the end of the bond to the rest of the molecule).

Epoxyalkoxy is especially epoxy-$C_1$-$C_7$alkoxy, such as especially a radical of formula

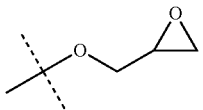

(the broken line marks the end of the bond to the rest of the molecule).

Acyl denotes, within this disclosure, always a radical of a carboxylic acid or of a sulfonic acid, for example an aryl-, alkyl- or aralkyl-carboxylic acid or -sulfonic acid radical, such as $C_1$-$C_7$alkanoyl, for example acetyl or propionyl, aroyl (aryl-C(=O)—), such as benzoyl, or the like.

Alkyl denotes, within this disclosure, always especially an unbranched or singly or multiply branched alkyl radical having, for example, from 1 to 20, preferably from 1 to 10, carbon atoms, for example having from 1 to 4 carbon atoms, wherein one or more, for example from 1 to 3, non-terminal chain segments that include a C atom (such as —$CH_2$— or —C(—)(H)—), which are preferably not directly adjacent but are especially separated by two carbon atoms, can each be replaced by a hetero atom, such as —N(—)—, —NH—, —O— or —S—, such as, for example, methyl, ethyl, n-propyl, isopropyl, n-butyl, sec-butyl, isobutyl or tert-butyl.

Alkenyl denotes, within this disclosure, always an unbranched or singly or multiply branched mono- or poly-unsaturated alkyl radical having from 2 to 20, preferably from 2 to 10, for example from 2 to 4 carbon atoms, such as vinyl, allyl or buten-1- or -2-yl.

Aminoalkyl denotes alkyl, as just defined, substituted by one or, furthermore, more amino group(s).

Heterocyclyl signifies especially a mono-, di- or tri-cyclic, especially monocyclic, radical, which is optionally also substituted, for example as defined above for aryl, having from 3 to 20, preferably from 3 to 8, ring atoms, of which one or more, especially two, is/are present as hetero atom(s) selected independently of one another from N, O and S, and may be substituted by one or more oxo groups, especially those bonded to ring carbon atoms, which are bonded by way of an O hetero atom (resulting in anhydrido).

Heterocyclyl accordingly also includes especially anhydrido, which is a cyclic radical containing the following ring-closing bridging element: —C(=O)—O—C(=O)—. The ring therefore includes a carboxylic acid anhydride group. A possible preferred example is 2,5-dioxo-oxolan-3-yl; another example is the corresponding unsaturated variant 2,5-dioxo-oxol-3-yl with the double bond between the carbon atoms in positions 3 and 4 of the ring, and a further example is a 2,5-dioxolan-3-yl radical benzo-fused in the 3,4-position.

Aromatic means that the radicals in question are defined as aryl above.

Aromatic-aliphatic (for example arylalkyl) means that the corresponding radicals include combinations of aliphatic radicals and aromatic radicals, as mentioned above.

"X denotes nothing" or "X being nothing" or the like means that the radical "—X—" in the formula in question denotes a single bond. $R_1$ being "nothing" means that the radical $R_1$ is absent.

"If present" relates to the fact that a radical or a symbol, depending on other definitions, may be present or absent, for example the fact that only when p in formula I is from 1 to 3 and $R_1$ denotes a radical of formula —[($CH_2$)$_{n*}$]$_{p*}$—Si($R^{B*}$)$_{3-t*}$($L^*$)$_{t*}$ is it possible for n*, p*, $R^{B*}$, L* and t* to be present at all.

Silanes that may or may not have reactive groups capable of participating in the polymerisation with a synthetic resin based on the epoxy-based hardening reactive synthetic resin(s) have, in other words, an optional content of such reactive groups, that is to say they can contain them.

Any reference to "silanes" or other constituents in the plural always signifies "one or more".

"Include" or "comprise" means that other components or features may be present in addition to the components or features mentioned and therefore denotes a non-exhaustive list, unlike "contain" the use of which does signify an exhaustive list of components or features.

"Partly or solely" or "at least partly" means that the constituents that follow may be present in addition to other constituents of the component in question or may be the only constituents present, for example (e.g. in the case of the silanes or reactive resins or hardeners as components) based on the component defined in the particular case, in amounts of a maximum of 10, 20, 30, 40, 50, 60, 70 or 80 to 90 or 100% by weight.

Where the attribute "furthermore" is mentioned, this means that greater preference may be given to features without this attribute.

"And/or" means that the features/substances mentioned can in each case be present on their own or in a combination of two or more of the particular features/substances mentioned.

(Meth)acrylic denotes acrylic, methacrylic, or acrylic and methacrylic (in admixture).

Si-bonded hydrolysable groups (also denoted by the symbol L in this disclosure) are to be understood as, for example, halogen atoms (halogen, such as chloro), ketoximates, amino, aminoxy, mercapto, acyloxy, aryloxy, aralkyloxy(=arylalkoxy) or especially alkyloxy(alkoxy).

Si-bonded hydrolysable groups are to be understood as being especially those groups L which are a constituent of a group of formula Z $$Si(R^B)_{3-t}(L)_t \qquad (Z),$$

wherein $R^B$, independently of any other, may denote an alkyl, alkenyl, arylalkyl or aryl group, preferably alkyl and/or (furthermore) alkenyl, t denotes an integer from 1 to 3, and L denotes an Si-bonded hydrolysable group, especially alkoxy.

The one or more silane(s) that are added according to the invention and include no or at least one amino, sec-amino, mercapto, isocyanato, alkenyl, (meth)acryloyl, anhydrido and/or (especially) epoxy group(s) and at the same time include at least one Si-bonded hydrolysable group preferably have average or absolute molecular weights of 2000 or less, 1000 or less, 900 or less, 800 or less, 700 or less, 600 or less or especially 500 or less or especially 400 or less. Such silanes are preferably low molecular weight, low-viscosity substances, especially other than higher molecular weight compounds (which include, for example, prepolymers).

In special forms of implementation of the invention there are used as silanes of formula I (added according to the invention) one or more selected from the group 3-aminopropyl-trialkoxysilanes, such as 3-aminopropyl-trimethoxysilane or 3-amino-propyl-triethoxysilane, N-(aminoalkyl)-3-aminopropyl-trialkoxysilane, such as N-(2-aminoethyl)-3-aminopropyl-trimethoxysilane or N—(N'-(2-aminoethyl)-2-aminoethyl)-aminopropyl-trimethoxysilane, 3-mercaptopropyl-trialkoxysilane, such as 3-mercaptopropyl-trimethoxysilane, tetraalkoxysilane, such as tetraethoxysilane, bis(3-trialkoxysilylpropyl)amine, such as bis(3-trimethoxysilylpropyl)amine, and furthermore 3-(meth)-acryloyl-oxypropyl-trialkoxysilanes, such as 3-(meth)acryloyl-oxypropyl-trimethoxy-silane and/or alkenylalkoxysilanes such as vinyltrimethoxysilane or vinyl-triethoxy-silane, and/or tetraalkoxysilane, such as tetraethoxysilane, tetramethoxysilane or tetra-propoxysilane or (preferably) 3-glycidyloxypropyl-trialkoxysilanes, such as 3-glycidyl-oxypropyl-trimethoxysilane or 3-glycidyloxypropyl-triethoxysilane, or (furthermore or especially) alkoxypolysilicate, such as ethyl or propyl polysilicate; or mixtures of two or more thereof.

The silanes that carry no or at least one amino, sec-amino, mercapto, isocyanato, alkenyl, (meth)acryloyl, anhydrido and/or (especially) epoxy group(s), especially that include epoxy (preferred), amino and/or thiol groups, and include at least one Si-bonded hydrolysable group are present in an injection synthetic mortar system according to the invention or for use according to the invention in a proportion by weight of, for example, from 0.1 to 25% by weight, especially of 1 or more % by weight, such as from 1 to 20% by weight, preferably of 2 or more % by weight, such as from 2 to 20 or up to 15% by weight, of 3 or more % by weight, such as from 3 to 20 or up to 10% by weight, more especially of 4 or more % by weight, for example from 4 to 20 or up to 6% by weight.

The hardening (used herein also to have equivalent meaning to "hardenable") reactive epoxy-based synthetic resins included in the use of or in fixing mortar systems according to the invention include an epoxy component, preferably based on glycidyl compounds, for example those having an average glycidyl group functionality of 1.5 or more, especially of 2 or more, for example from 2 to 10, which may optionally include further glycidyl ether(s) as reactive diluents. The epoxides of the epoxy component are preferably poly(including di)-glycidyl ethers of at least one polyvalent alcohol or phenol, such as novolak, bisphenol F or bisphenol A, or mixtures of such epoxides, for example obtainable by reaction of the corresponding polyvalent alcohols with epichlorohydrin. Examples are trimethylolpropane triglycidyl ether, novolak epoxy resins, bisphenol A-epichlorohydrin resins and/or bisphenol F-epichlorohydrin resins, for example having an average molecular weight of ≤2000. The epoxy resins can have, for example, an epoxy equivalent of from 120 to 2000, preferably from 150 to 400, such as especially from 155 to 195, for example from 165 to 185. The proportion of the total mass of the reactants and additives of the injection synthetic mortar system is preferably from 5 to less than 100% by weight, especially from 10 to 80% by weight, from 10 to 70% by weight or from 10 to 60% by weight. Also possible are mixtures of two or more such epoxy components. Suitable epoxy resins, reactive diluents and hardeners are also to be found in the standard work of Lee H and Neville K, "Handbook of Epoxy Resins" (New York: McGraw-Hill), 1982 (those compounds are incorporated herein by reference).

"Based on" means especially that the (injection) synthetic mortar systems according to the invention can include, in addition to the mentioned components (such as (A) and (B)), also further customary ingredients (for example additives or other constituents mentioned above or below). Such further ingredients can be present, for example, in an amount of in total up to 80% by weight, preferably between 0.01 and 65% by weight. Even where "based on" is not expressly mentioned, such customary ingredients are included.

Important examples of further ingredients are one or more selected from accelerators, inhibitors, reactive diluents, thixotropic agents, fillers and further additives.

As accelerators there may be included, for example, tert-amines, such as imidazoles or tert-aminophenols, such as 2,4,6-trimethylaminomethylphenol, organophosphines or Lewis bases or acids, such as phosphoric acid esters, or mixtures of two or more thereof, in one or (especially in the case of multi-component systems) more of the components, preferably in each case in a hardener component, for example in a proportion by weight of from 0.001 to 15% by weight, based on the total mass of the reactants and additives of the injection synthetic mortar system.

As thixotropic agents there can be used customary rheology aids, such as pyrogenic silica. They can be added, for example, in a proportion by weight of from 0.001 to 50% by weight, for example from 1 to 20% by weight.

As fillers there are used customary fillers, especially cements (for example Portland cements or high-alumina cements), chalks, sand, quartz sand, quartz powder or the like, which can be added in the form of powder, in granular form or in the form of shaped bodies, or other fillers, such as, for example, those mentioned in WO 02/079341 and WO 02/079293 (which in this regard are incorporated herein by reference), or mixtures thereof, it being possible for the fillers furthermore or especially also to be silanised, for example in the form of amino- or epoxy-silane-treated quartz powder, such as Silbond AST or EST® from Quarzwerke GmbH, in the form of amino- or glycidyl-silane-treated silica, such as Aktisil AM or EM® from Hoffmann Mineral, or amino- or glycidyl-silane-treated pyrogenic silicas. The fillers can be present in one or more components of, for example, a multi-component kit according to the invention, for example one or both components of a corresponding two-component kit; the proportion of fillers is preferably from 0 to 90% by weight, for example from 10 to 90% by weight. In addition or alternatively, hydraulically hardenable fillers, such as gypsum, calcined chalk or cement (for example alumina cement or Portland cement), water glass or active aluminium hydroxides, or two or more thereof, can be added.

Further additives may also be added, such as plasticisers, non-reactive diluents, flexibilisers, stabilisers, rheology aids, wetting agents, colouring additives, such as dyes or especially pigments, for example for staining the components different colours for better monitoring of their intermixing, or the like, or mixtures of two or more thereof. Such further additives can preferably be added in total in proportions by weight of in total from 0 to 90%, for example from 0 to 40% by weight.

Certain of the compounds mentioned in the definition of the epoxides, such as trimethylolpropane triglycidyl ether or hexanediol diglycidyl ether, which have a lower viscosity than epoxides containing aromatic groups, can also be used as reactive diluents, for example in a proportion by weight of from 0.1 to 90% by weight, for example between 0.5 and 75% by weight or between 1 and 40% by weight.

The hardener includes at least one compound customarily used for epoxy hardening (reactant in the polyaddition), the term "hardener" preferably meaning at least one compound customarily used for epoxy hardening, with or without addition of filler, and/or further additives, such as water, thickeners and/or further added ingredients, such as dyes and the like, in other words the complete hardener component. The hardener can be incorporated in the form of a separate component and/or (especially in protected form, that is to say, for example, in microencapsulated form) also in the reaction resin formulation (as a hardenable component, that is to say a component which cures by polymerisation after mixing with the hardener once the casing of the microcapsules has been broken open). Customary additives, such as, for example, fillers (especially as defined above) and/or (especially for the preparation of a paste or emulsion) solvents, such as benzyl alcohol and/or water, can be added, it being possible for water or acids or mixtures thereof, such as water, salicylic acid and/or acetic acid, to serve as "hardener" (initiator) for the condensation of the silanes that include hydrolysable groups and to be present only when the hardener component is otherwise free of silanes.

The compounds customarily used for epoxy hardening (which act as reactants in the polyaddition) are especially those having two or more groups selected from amino, imino and mercapto, for example corresponding amines (preferred), thiols or amino thiols, or mixtures thereof, for example as mentioned in Lee H and Neville K, "Handbook of Epoxy Resins" (New York: McGraw-Hill), 1982, which in this regard is incorporated herein by reference, for example di- or poly-amines mentioned therein, and/or di- or poly-thiols.

In special forms of implementation of the invention, the compounds customarily used for epoxy hardening, the epoxy base, or both, have no rubber modification.

The compounds (generally) customarily used for epoxy hardening comprise, for example, in one form of implementation of the invention

- di- or poly-amines such as especially aliphatic (such as ethylenediamine), cyclo-aliphatic and aromatic di- or poly-amines, amidoamines, amine adducts, polyether diamines or polyphenyl/polymethylene-polyamines, Mannich bases, polyamides and the like (special preference being given to Mannich bases, especially as disclosed in the publication WO 2005/090433, especially on page 3, last paragraph, to page 6, second paragraph, such as in Example 1 or, especially, 2 thereof, which in this regard is incorporated herein by reference, on their own or in admixture with one or more further di- or poly-amines);
- di- or poly-thiols such as especially difunctional or higher-functional thiols, for example dimercapto-α,ω-$C_1$-$C_{12}$alkanes, 4,4'-dimercapto-dicyclohexylmethane, di-mercapto-diphenylmethane or the like;
- furthermore aliphatic aminols, such as especially hydroxy-lower alkylamines, such as ethanolamine, diethanolamine or 3-aminopropanol, or aromatic aminols, such as 2-, 3- or 4-aminophenol.

It is also possible for mixtures of two or more of the mentioned compounds customarily used for epoxy hardening to be used or included.

The compounds customarily used for epoxy hardening are, if present, preferably present in amounts of up to 95% by weight, preferably from 2 to 70% by weight, based on the total mass of the reactants and additives of the composition of the injection synthetic resin system being cured.

Based on the hardener component, the proportion of the compounds in question in a possible preferred form of implementation of the invention is from 1 to 100% by weight (since aminosilanes on their own can also be used as hardener), for example from 3 to 95% by weight, for example from 4 to 95% by weight, from 5 to 90% by weight or from 10 to 80% by weight.

Especially in the case of a hardener component of a multi-component system according to the invention it is also possible for further additives to be a constituent of the "hardener", such as water, organic solvents, such as benzyl alcohol, fillers (for example as mentioned above) and further of the above-mentioned additives, for example in a proportion by weight of in total from 0.01 to 70% by weight, for example from 1 to 40% by weight.

A hole or crevice is to be understood as being a hole or crevice that is present in a solid substrate (especially a substrate already finished as such), especially masonry or concrete, especially a cracked substrate, such as cracked concrete, and is accessible from the outside, for example a drilled hole, or furthermore a recessed region made during mortaring with cement or gypsum, or the like.

In a special form of implementation of the invention, the epoxide(s) (epoxy component) and the (associated) hardener (compound(s) customarily used for epoxy hardening) are stored separately from one another in a two-component or multi-component system, before they are mixed together at the desired location (for example at or in a hole or crack, such as a drilled hole).

Such systems are especially two-component systems in which the ratio by weight of a first component (A) to a second component (B) is from 99:1 to 1:99, from 99:1 to 50:50, from 99:1 to 60:40 or from 99:1 to 70:30.

Components that would otherwise undesirably react with one another, such as water and/or acids and the hydrolysable groups of the silanes to be used according to the invention, or water and cement, are preferably to be kept separate from one another prior to use in the hole or crevice.

For example, a component (A) of such a two-component or furthermore multi-component system therefore includes the epoxide(s), while the component (B) includes the hardener. The silanes can be provided independently as a third component, or they are a constituent of the epoxy and/or hardener component. Preferably the silanes having an amino, sec-amino and/or mercapto group are included in the hardener component, while silanes carrying epoxy, furthermore also isocyanato, (meth)acryloyl and/or anhydrido groups are preferably included in the epoxy component. Silanes having hydrolysable groups can be present in both components. In all cases, the components in which silanes are present are to be kept substantially free of water (for example less than 0.1%, especially less than 0.05% by weight water, based on the total weight of the component in question) in order not to cause any undesired hydrolysis and cross-linking by means of the Si-bonded hydrolysable groups, or the silanes and the water are to be kept separate from one another (for example by microencapsulation).

The injection synthetic resin systems according to the invention can consequently be provided, and also used, in the form of a single component system (provided components that will react with any further components present, for example the hardener, are protected, for example encapsulated) or preferably multi-component systems (multi-component kit).

A multi-component kit is especially to be understood as being a two-component or (furthermore) multi-component kit (preferably a two-component kit) having a component (A), which includes one or more compounds carrying epoxy groups, such as glycidyl groups, as described hereinabove and hereinbelow, and hardener (component (B)), it being possible to provide further additives in one or both of the components, preferably a two-chamber or, furthermore, multi-chamber device, wherein the components (A) and (B) that are able to react with one another and optionally further separate components are present in such a way that their constituents cannot react with one another (especially with curing) during storage, preferably in such a way that their constituents do not come into contact with one another prior to use, but that enables components (A) and (B) and optionally further components to be mixed together for fixing at the desired location, for example directly in front of or in a hole, and if necessary introduced in such a way that the hardening reaction can take place therein. Also suitable are capsules, for example made of plastics, ceramics or especially glass, in which the components are separated from one another by means of rupturable boundary walls (which can be ruptured, for example, when an anchoring element is driven into a hole or a crevice, such as a drilled hole) or integrated separate rupturable containers, for example in the form of capsules, such as ampoules, arranged one inside the other; and also especially multi-component or especially two-component cartridges (which are likewise especially preferred), the chambers of which contain the plurality of components or preferably the two components (especially (A) and (B)) of the fixing mortar according to the invention having the compositions mentioned hereinabove and hereinbelow for storage prior to use, the kit in question preferably also including a static mixer.

The use of a fixing mortar according to the invention at the desired site of use is effected by mixing the associated components, especially close to and/or directly in front of a hole or (for example especially when cartridges having static mixers are used) directly in front of and/or (especially when suitable capsules or ampoules are ruptured) inside a hole or crevice, for example a drilled hole.

"Embedding in mortar" is especially to be understood as meaning (material-based and/or interlocking) fixing of anchoring means made of metal (for example undercut anchors, threaded rods, screws, drill anchors, bolts) or, furthermore, made of some other material, such as plastics or wood, in solid substrates (preferably already finished as such), such as concrete or masonry, especially insofar as they are components of artificially erected structures, more especially masonry, ceilings, walls, floors, panels, pillars or the like (for example made of concrete, natural stone, masonry made of solid blocks or perforated blocks, furthermore plastics or wood), especially in holes, such as drilled holes. Those anchoring means can then be used to secure, for example, railings, covering elements, such as panels, façades or other structural elements.

Any reference to "mixtures of two or more thereof" includes especially mixtures of at least one of the mentioned constituents that are highlighted as being preferred with one or more other components, especially with one or more components likewise characterised as being preferred.

"Finished as such" means especially that the substrates are already finished (for example in the form of building blocks or walls) except for possible surface modifications (such as coating, for example plastering or painting) or the like and are not finished only at the same time as the fixing mortar nor consist thereof. In other words: the fixing mortar is preferably not itself an already finished substrate.

The introduction of the anchoring means is preferably effected only a short time, preferably 30 minutes or less, after the components of the fixing mortar according to the invention have been mixed together. In explanation: the mixing and introduction of the components on or into the desired locations at which anchoring means are to be fixed, especially holes, such as drilled holes, initiates a plurality of reactions which take place substantially in parallel and/or with only a very small time interval between them, especially the polyaddition: the final curing takes place in situ.

Specific forms of implementation of the invention also relate to:
(a) A two-component or multi-component fixing mortar, based on hardening (after starting and by reaction with a hardener) epoxy-based reactive resins, for embedding anchoring means in mortar in holes or crevices, characterised in that it includes silanes which may or may not have reactive groups capable of participating in the polyreaction with a hardenable epoxy-based reactive resin but which in any case have Si-bonded hydrolysable groups.
(b) A fixing mortar system in accordance with paragraph (a), characterised in that it includes partly or solely as silanes one or more silanes that carry no or at least one amino, sec-amino, mercapto, isocyanato, alkenyl, (meth)acryloyl, anhydrido and/or (especially) epoxy group(s), especially that include epoxy (especially preferred), amino and/or thiol groups, and include at least one Si-bonded hydrolysable group.
(c) Fixing mortar system in accordance with paragraph (a), characterised in that it includes as silanes partly or solely those of formula I, as defined above.
(d) Fixing mortar system in accordance with one of paragraphs (a) to (c), characterised in that it includes as silanes partly or solely those exhibiting the alpha effect.
(e) Fixing mortar system in accordance with one of paragraphs (a) to (d), characterised in that the silanes have partly or solely reactive groups capable of participating in the polyreaction with a hardenable epoxy-based reactive resin and/or a hardener corresponding thereto.
(f) Fixing mortar system in accordance with one of paragraphs (a) to (e), characterised in that it includes as silanes partly or solely those of formula II, as defined above.
(g) Fixing mortar system in accordance with paragraph (f), characterised in that it includes as silanes partly or solely those of formula II in which Y denotes epoxyalkoxy (preferred), $R_1^{}$—NH or SH, wherein $R_1^{}$ denotes hydrogen, alkyl or aminoalkyl, and the other symbols are as defined for formula II.
(h) Injection synthetic mortar system in accordance with one of paragraphs (a) to (g), characterised in that it includes as silanes partly or solely those of formula III, as defined above.
(i) Injection synthetic mortar system in accordance with one of paragraphs (a) to (h), characterised in that as Si-bonded hydrolysable groups in the silanes there are present one or more selected from halogen, ketoximate groups, amino, aminoxy, mercapto, acyloxy, aryloxy, aralkyloxy (=arylalkoxy) and especially alkyloxy(=alkoxy).
(j) Fixing mortar system in accordance with one of paragraphs (a) to (i), characterised in that in one component it includes water (which is able to react with the hydrolysable groups of the silanes and, where applicable, with cement or other hydraulically hardenable substances).
(k) Fixing mortar system in accordance with one of paragraphs (a) to (j), characterised in that it includes further hydraulically hardenable substances, such as cements (for example Portland cement or high-alumina cements) in the component including the hardenable reactive resins and the silanes.
(l) Fixing mortar system in accordance with one of paragraphs (a) to (k), characterised in that as silane there are included 3-aminopropyl-trialkoxysilane, N-(aminoalkyl)-3-aminopropyl-trialkoxysilane, 3-mercaptopropyl-trialkoxysilane, tetraethoxysilane, bis(3-trialkoxypropylsilylpropyl)amine, 3-(meth)acryloyl-oxypropyltrialkoxysilane, alkenyl-tri-alkoxysilane, tetraalkoxysilane or (especially) 3-glycidyloxypropyl-trialkoxysilane or (furthermore) alkoxypolysilicate, or mixtures of two or more thereof.

(m) Fixing mortar system in accordance with one of paragraphs (a) to (I), characterised in that as silane there are included partly or only 3-aminopropyl-trimethoxysilane, N-(2-aminoethyl)-3-aminopropyl-trimethoxysilane, 3-mercaptopropyl-trimethoxysilane, bis(3-trimethoxysilylpropyl)amine, vinyltrimethoxysilane, vinyltriethoxysilane, or tetraethoxysilane, tetramethoxysilane, tetrapropoxysilane, or (especially) 3-glycidyloxypropyl-trimethoxysilane, (especially) 3-glycidyloxypropyl-triethoxysilane, or (furthermore or especially) ethyl or propyl polysilicate; or mixtures of two or more thereof.

(n) Fixing mortar systems in accordance with one of paragraphs (a) to (m), characterised in that the hardenable epoxy-based reactive resin(s) include(s) as epoxide polyglycidyl ethers of at least one polyvalent alcohol or phenol.

(o) Fixing mortar systems in accordance with one of paragraphs (a) to (m?), characterised in that the hardenable (=hardening in the presence of hardener) epoxy-based reactive resin(s) include(s) as epoxide polyglycidyl ethers of novolak, bisphenol F or bisphenol A, or mixtures of such epoxides, with or without a reactive diluent, especially trimethylolpropane triglycidyl ether.

The proportion of the total mass of the reactants and additives of the fixing mortar system is preferably from 5 to less than 100% by weight, especially from 10 to 80% by weight, from 10 to 70% by weight or from 10 to 60% by weight. Also possible are mixtures of two or more such epoxide components.

(p) Fixing mortar system in accordance with one of paragraphs (a) to (o), characterised in that it includes as hardener those having two or more groups selected from amino, imino and mercapto, for example corresponding amines or thiols, or furthermore thio alcohols, amino alcohols or amino thiols, or mixtures of such compounds.

(q) Fixing mortar system in accordance with one of paragraphs (a) to (p), characterised in that it is a two-component system, especially in the form of a two-chamber cartridge without or with a static mixer.

(r) Use of a fixing mortar system in accordance with one of paragraphs (a) to (q) for embedding anchoring means in mortar in holes or crevices, especially in drilled holes, such as moist drilled holes, in which the injection synthetic mortar system and an anchoring means are introduced into a hole or crevice (especially in a cracked substrate, such as cracked concrete) and the fixing mortar system is caused to cure.

(r) Process or method for embedding anchoring elements in mortar in holes or crevices, in which a fixing mortar system in accordance with one of paragraphs (a) to (q) is used for embedding anchoring means in mortar, the fixing mortar system and an anchoring means being introduced into a hole or crevice (especially in a cracked substrate, such as cracked concrete) and the fixing mortar system being caused to cure.

(t) Use, or a process including such use, especially in accordance with paragraph (r) or paragraph (s), of a fixing mortar in accordance with one of paragraphs (a) to (q) for embedding anchoring means in mortar, especially, for example, commercially available threaded rods, in the tension zone, that is to say in cracked concrete or, furthermore, concrete at risk of cracking or especially cracked concrete.

(u) Use of silanes, as included in one of paragraphs (a) to (i), (l) or (m), for prolonging the storage ability of a fixing mortar in accordance with one of paragraphs (a) to (q).

(v) Fixing mortar in accordance with one of paragraphs (a) to (q), characterised in that, using, for example, commercially available threaded rods, after curing it meets at least the criterion of resistance in static linear cracking in accordance with ETAG 01 Part 5 $\alpha_{req}$ of 0.8 and in dynamic linear cracking in accordance with ETAG 01 Part 5 $\alpha_{req}$ of 0.9.

The following Examples serve to illustrate the invention but do not limit the scope thereof.

EXAMPLE 1

Comparison Example (Without Silane Additive According to the Invention)

Here a two-component injection synthetic mortar system (product number FIS EM 390 S (fischerwerke GmbH & Co. KG, Waldachtal, Germany)) having the following composition is used:

Component A: bisphenol A/F-epichlorohydrin resin having an average molecular weight ≤700, white Portland cement, trimethylolpropane triglycidyl ether, phosphoric acid ester;

Component (B): Mannich base, m-phenylenebis(methylamine), 2,4,6-tris(dimethyl-aminomethyl)phenol, 4,4'-isopropylene diphenol, benzyl alcohol, Portland cement.

The components are subjected to an adhesion failure test, using a commercially available two-chamber cartridge with a static mixer, in line with the conditions described above for the use of the guidelines of the "European Organisation for Technical Approvals" (EOTA) (2001): ETAG No. 001 November 2006 edition, Guideline for European Technical Approval of Metal Anchors for Use in Concrete", Part 5: Bonded Anchors, February 2008, under 5.1.2.1 (b) and the mean value of the adhesion failure load from five tests for M12 bolts at an anchoring depth of 72 mm is determined.

EXAMPLES 2 to 4

Injection Synthetic Resin Systems Having the Silane Additive According to the Invention The silane mentioned in the following Table was added to the injection synthetic mortar system mentioned in Example 1 in component (A) and/or (B), in each case in a proportion by weight of 5% by weight, based on the total weight of the individual component in question, whereupon the adhesion failure loads likewise mentioned in Table 1 below were found:

TABLE 1

| Example | Additive | Average adhesion failure load [kN] | Change in % |
| --- | --- | --- | --- |
| Comparison Example 1 | None | 80.1 | |
| Example 2 | A: 5% Glycidyloxypropyl-trimethoxysilane B: 5% Aminopropyl-triethoxysilane | 91.8 | 14.1 |
| Example 3 | A: 5% Glycidyloxypropyl-trimethoxysilane | 90.6 | 13.1 |

TABLE 1-continued

| Example | Additive | Average adhesion failure load [kN] | Change in % |
|---|---|---|---|
| Example 4 | B: 10% Aminopropyl-triethoxysilane | 89.3 | 11.5 |

EXAMPLES 5-9

Further Fixing Mortars Having the Silane Additive According to the Invention

The silane mentioned in Table 2 below was in each case added to the injection synthetic mortar system mentioned in Example 1 in component (A) and/or (B), based on the total weight of the individual components:

TABLE 2

| Example | Additive |
|---|---|
| Example 5 | A: 3% 3-Glycidyloxymethyl-trimethoxysilane |
| Example 6 | B: 6% Aminoethylaminoethylaminopropyl-trimethoxysilane |
| Example 7 | A: 5% 3-Acryloxypropyl-trimethoxysilane |
| Example 8 | B: 2% 3-Mercaptopropyl-trimethoxysilane |
| Example 9 | A: 8% Tetraethoxysilane |

EXAMPLE 10

Fixing Mortar with Glycidyloxypropyl-trimethoxysilane

A hardener and a mortar, as described in Example 1, is prepared. Unlike Example 1, the content of trimethylolpropane triglycidyl ether in the mortar formulation is replaced by glycidyloxypropyl-trimethoxysilane.

EXAMPLES 11 to 18

Cartridges Having a Static Mixer and Two-Component Fixing Mortars According to the Invention In two-chamber cartridges having a total content of 390 ml and a mixing ratio component A:component B of 3:1, the two chambers are filled with component A and component B of a fixing mortar in accordance with one of Examples 2 to 9. The cartridges are closed and packaged together with a suitable static mixer to form two-component kits. In principle, combinations of silanes in A and B are also possible, as shown in Example 2 (that is to say, for example, a cartridge produced from Example 5 and 6).

EXAMPLE 18

Suitability for Use in Static and Dynamic Linear Cracking

For a formulation corresponding to Examples 1 and 2, the suitability for use in static linear cracking (test criterion in accordance with ETAG 01 Part 5) and in dynamic linear cracking (test criterion in accordance with ETAG 01 Part 5) was checked using commercially available threaded rods.

Significant improvements over the silane-free formulation in accordance with Example 1 are obtained. Although both formulations meet the required test criteria of ETAG 01 Part 5 in respect of tests in cracked concrete, that is to say both in static linear cracking and in dynamic linear cracking the $\alpha_{req}$ of 0.8 and 0.9, respectively, are achieved, in the case of Example 2 they are surprisingly achieved at a 20% higher load level.

The invention claimed is:

1. A process for embedding anchoring elements in mortar in holes or crevices, the process comprising:
    introducing into a hole or crevice a fixing mortar system and an anchoring means; and
    curing the synthetic mortar system;
    wherein said fixing mortar system comprises one or more hardening epoxy-based reactive resins, and one or more silanes, wherein at least one silane has at least one Si-bonded hydrolysable group and one or more reactive groups capable of participating in the polymerisation with a synthetic resin based on the hardening epoxy-based reactive synthetic resin(s), said silanes having an absolute molecular weight of 400 or less, and
    at least one of the silanes has at least one amino, sec-amino, mercapto, isocyanato, alkenyl, (meth)acryloyl, anhydrido and/or epoxy group(s), and includes at least one Si-bonded hydrolysable group.

2. The process according to claim 1, wherein in the mortar system at least one silane has the formula I

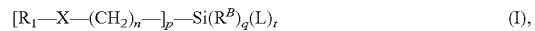

wherein
X denotes S or NR$_1$* or O or NCO or nothing; with X being nothing when R$_1$ denotes anhydrido;
R$_1$ and R$_1$*, all independently of one another, denote nothing, hydrogen, cycloalkyl, alkyl, aminoalkyl, (meth) acryloyl, aryl, aralkyl, acyl, heterocyclyl, a radical of the formula —[(CH$_2$)$_{n*}$]$_{p*}$—Si(R$^{B*}$)$_{3-t*}$(L*)$_{t*}$ or epoxyalkyl, wherein, in each case independently of the other radical, R$^{B}$* is as defined below for R$^B$, L* is as defined below for L and n*, p* and t* are in each case as defined below; with R$_1$ being hydrogen when X denotes S; with X being O when R$_1$ is epoxyalkyl or (meth)acryloyl; with R$_1$ being nothing when X denotes NCO;
R$^B$, independently of any other, denotes an alkyl, arylalkyl, aryl group, and/or alkenyl, L denotes a hydrolysable radical, n and, if present, n* independently of one another denote a positive integer;
p denotes from 0 to 3 and, if present, p* independently denotes from 1 to 3;
q denotes from 0 to 2; and
t denotes from 1 to 4 and, if present, t* independently denotes from 1 to 3, with the proviso that p+q+t=4 and, if present, p*+(3−t*)+t*=4.

3. The process according to claim 1, wherein the fixing mortar system comprises at least one silane exhibiting the alpha effect.

4. The process according to claim 1, wherein in the fixing mortar system at least one silane has the formula II

wherein
Y denotes epoxyalkoxy, R$_1$—NH or SH, wherein R$_1$ denotes hydrogen, alkyl or aminoalkyl,
R$^B$ denotes, independently of any other, an alkyl, alkenyl, arylalkyl, aryl group, and/or alkenyl,
L denotes a hydrolysable radical,
a denotes a positive integer; and
t denotes from 1 to 3.

5. The process according to claim 4, wherein Y denotes epoxyalkoxy.

6. The process according to claim 1, wherein in the fixing mortar system at least one silane has the formula III

wherein $R^B$ denotes, independently of any other(s), an alkyl, alkenyl, arylalkyl, aryl group, and/or alkenyl, L denotes a hydrolysable radical, and t denotes from 1 to 4.

7. The process according to claim 1, where in the fixing mortar system the Si-bonded hydrolysable groups in at least silane is selected from among halogen, ketoximate groups, amino, aminoxy, mercapto, acyloxy, aryloxy, aralkyloxy and alkyloxy.

8. The process according to claim 1, wherein in the fixing mortar system the at least one silane is chosen from 3-aminopropyl-trialkoxysilane, N-(aminoalkyl)-3-aminopropyl-trimethoxysilane, 3-mercaptopropyl-trialkoxysilane, tetraalkoxysilane, bis(3-trialkoxysilylpropyl)amine, 3-(meth)acryloyl-oxypropyl-trialkoxysilane, alkenyl-trialkoxysilane, tetraalkoxysilane, 3-glycidyloxypropyl-trialkoxysilane alkoxypolysilicate, and mixtures of two or more thereof.

9. The process according to claim 1, wherein in the fixing mortar system the at least one silane is chosen from 3-aminopropyl-trimethoxysilane, N-(2-aminoethyl)-3-aminopropyl-trimethoxysilane, 3-mercaptopropyl-trimethoxysilane, vinyltrimethoxysilane, vinyltriethoxysilane, tetraethoxysilane, tetramethoxysilane, tetra-propoxysilane, 3-glycidyloxypropyl-trimethoxysilane, bis(3-trimethoxysilylpropyl)amine, ethyl polysilicate, propyl polysilicate, and mixtures of two or more thereof.

10. The process according to claim 1, wherein the hardening epoxy-based reactive synthetic resin(s) include(s) as epoxide polyglycidyl ethers of at least one polyvalent alcohol or phenol.

11. The process according to claim 1, wherein the the hardening epoxy-based reactive resin(s) include(s) as epoxide polyglycidyl ethers of novolak, bisphenol F or bisphenol A, or mixtures of such epoxides, with or without a reactive diluent.

12. The process according to claim 1, wherein the fixing mortar system comprises a hardener having two or more groups selected from amino, imino and mercapto.

13. The process according to claim 1, wherein the fixing mortar system is a two-component system in the form of a two-chamber cartridge without or with a static mixer.

* * * * *